US009047306B1

(12) United States Patent  (10) Patent No.: US 9,047,306 B1
Frolund et al.  (45) Date of Patent: Jun. 2, 2015

(54) METHOD OF WRITING DATA

(75) Inventors: Svend Frolund, Aalborg (DK); Arif Merchant, Los Gatos, CA (US); Alistair Veitch, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2825 days.

(21) Appl. No.: 11/252,335

(22) Filed: Oct. 17, 2005

(51) Int. Cl.
    *G06F 17/30* (2006.01)

(52) U.S. Cl.
    CPC .................................. *G06F 17/30174* (2013.01)

(58) Field of Classification Search
    CPC .................................................. G06F 17/30174
    USPC ......................................................... 707/1, 2, 3
    See application file for complete search history.

(56) References Cited

U.S. PATENT DOCUMENTS

| | | |
|---|---|---|
| 5,212,788 A | 5/1993 | Lomet et al. |
| 5,430,869 A | 7/1995 | Ishak et al. |
| 5,452,445 A | 9/1995 | Hallmark et al. |
| 5,504,900 A | 4/1996 | Raz |
| 5,546,582 A | 8/1996 | Brockmeyer et al. |
| 5,644,763 A | 7/1997 | Roy |
| 5,701,480 A | 12/1997 | Raz |
| 5,768,538 A | 6/1998 | Badovinatz et al. |
| 5,799,305 A | 8/1998 | Bortvedt et al. |
| 5,920,857 A | 7/1999 | Rishe et al. |
| 5,953,714 A | 9/1999 | Abdullah |
| 6,052,712 A | 4/2000 | Badovinatz et al. |
| 6,148,295 A | 11/2000 | Megiddo et al. |
| 6,219,667 B1 | 4/2001 | Lu et al. |
| 6,421,688 B1 | 7/2002 | Song |
| 6,842,834 B2 * | 1/2005 | Crockett et al. ............... 711/162 |
| 7,069,318 B2 * | 6/2006 | Burbeck et al. ............... 709/224 |
| 7,266,716 B2 | 9/2007 | Frolund |
| 7,284,088 B2 | 10/2007 | Frolund |
| 7,310,703 B2 | 12/2007 | Frolund |
| 2003/0187973 A1 * | 10/2003 | Wesley ......................... 709/224 |
| 2004/0230596 A1 | 11/2004 | Veitch et al. |
| 2004/0230624 A1 | 11/2004 | Frolund et al. |
| 2004/0230862 A1 | 11/2004 | Merchant et al. |
| 2005/0091450 A1 * | 4/2005 | Frolund et al. ................ 711/114 |

(Continued)

FOREIGN PATENT DOCUMENTS

EP 1160682 A1 12/2001

OTHER PUBLICATIONS

Khalil Amiri et al., Highly concurrent shared storage, 2000, Pittsburgh, PA.

(Continued)

*Primary Examiner* — Scott A Waldron
(74) *Attorney, Agent, or Firm* — Law Offices of Derek J. Westberg

(57) ABSTRACT

An embodiment of a method of writing data begins with a first step of generating a timestamp. A second step issues a query that includes the timestamp to each of a plurality of primary storage devices. The method continues with a third step of receiving a query reply from at least a quorum of the primary storage devices. The query replies indicate that the timestamp is later than an existing timestamp for the data. In a fourth step, the data is mirrored to secondary storage after receiving the query reply from at least the quorum of the primary storage devices. Upon receiving a mirror completion message from the secondary storage, a fifth step issues a write message that includes at least a portion of the data and the timestamp to each of the primary storage devices.

44 Claims, 4 Drawing Sheets

(56) References Cited

U.S. PATENT DOCUMENTS

| | | |
|---|---|---|
| 2005/0091451 A1 | 4/2005 | Frolund et al. |
| 2005/0091556 A1* | 4/2005 | Frolund et al. .............. 714/2 |
| 2006/0143497 A1* | 6/2006 | Zohar et al. ................ 714/4 |

OTHER PUBLICATIONS

Khalil Amiri et al., Highly concurrent shared storage, The 20th International Conference on Distributed Computing Systems, 2000, pp. 298-307, IEEE Computer Society, Washington DC.

Hagit Attiya et al., Sharing Memory Robustly in Message-Passing Systems (Extended Abstract), Proceedings of the Ninth Annual ACM Symposium on Principles of Distributed Computing, 1990, pp. 363-375, ACM Press, New York, NY.

Hagit Attiya et al., Sharing Memory Robustly in Message-Passing Systems, Journal of the Association for Computing Machinery, 1995, 42(1):124-142, ACM Press, New York, NY.

Steven Berson et al., Randomized Data Allocation for Real-time Disk I/O, 1996, Marina Del Rey, CA.

Partha Dutta et al., An Efficient Universal Construction for Message-Passing Systems (Preliminary Version), Technical Report EPFL/IC/20002/28, 2002, Swiss Federal Institute of Technology, Lausanne, Switzerland.

Svend Frolund et al., Fab: enterprise storage systems on a shoestring, Proceedings of HOTOS IX: The Ninth Workshop on Hot topics in Operating Systems, 2003, pp. 169-174, The USENIX Association, Berkeley, CA.

Svend Frolund et al., A Decentralized Algorithm for Erasure-Coded Virtual Disks, Jun. 28, 2004, Palo Alto, CA.

Garth R. Goodson et al., Decentralized Storage Consistency via Versioning Servers, Technical Report CMU-CS-02-180, 2002, Carnegie Mellon University, Pittsburg, PA, Sep. 2002.

Steven Hand et al., Mnemosyne: Peer-to-Peer Steganographic Storage, Electronic Proceedings for the 1st International Workshop on Peer-to-Peer Systems, 2002, Rice University, Houston TX. <http://www.cs.rice.edu/Conferences/IPTPS02/107.pdf>.

Maurice P. Herlihy et al., Linearizability: A Correctness Condition for Concurrent Objects, ACM Transactions on Programming Languages and Systems, 1990, 12(3):463-492, ACM Press, New York, NY.

Hui-I Hsiao et al., Chained Declustering: A New Availability Strategy for Multiprocssor Database machines, 1990, University of Wisconsin, Madison, WI.

Hans-Peter Kriegel et al., Managing Intervals Efficiently in Object-Relational Databases, Proceedings 2000 VLDB Conference 2000, pp. 407-418, Morgan Kaufmann Publishers, San Francisco, CA.

John Kubiatowicz et al., Ocearistore: An Architecture for Global-Scale Persistent Storage, Proceedings of the Ninth International Conference on Architectural Support for Programming Languages and Operating Systems, 2000, pp. 190-201, ACM Press, New York, NY.

Leslie Lamport, On Interprocess Communication, 1985, Mountain View, CA. <http://research.microsoftcom/users/lamport/pubs/interprocess.pdf>.

Leslie Lamport, The Part-Time Parliament, 2000, Mountain View, CA.

Edward K. Lee et al., Petal: Distributed Virtual Disks, Proceedings of the Seventh International Conference on Architectural Support for Programming Languages and Operating Systems, 1996, pp. 84-92, ACM Press, New York, NY.

Barbara Liskov et al., Replication in the Harp File System, 1991, Cambridge, MA.

Nancy Lynch et al., Robust emulation of shared memory using dynamic quorum-acknowledged broadcasts, 1996, Cambridge, MA.

Nancy Lynch et al., Rambo: A Reconfigurable Atomic Memory Service for Dynamic Networks, Distributed Computing: 16th International Conference, 2002, pp. 173-190, Springer-Verlag, Heidelberg, Germany.

Dahlia Malkhi et al., Byzantine Quorum Systems, 1998, Florham Park, NJ.

Arif Merchant et al., Analytic Modeling of Clustered RAID with Mapping Based on Nearly Random Permutation, IEEE transactions on Computers, 1996, 45(3):367-373, IEEE Computer Society Press, Washington DC.

Gabriel Mizrahi, The Hashing Approach to the Internet File System Problem, M.A. Thesis, Department of Mathematics, 2001, University of Haifa, Israel, Nov. 2001.

James S. Plank, A Tutorial on Reed-Solomon Coding for Fault-Tolerance in RAID-like Systems, Software—Practice and Experience, 1997, 27(9):995-1012, John Wiley & Sons, Ltd., Hoboken, NJ.

Yasushi Saito et al., FAB: Building Distributed Enterprise Disk Arrays from Commodity Components, Oct. 9, 2004, Palo Alto, CA.

Jose Renato Santos et al., Comparing Random Data Allocation and Data Striping in Multimedia Servers, Proceedings of the 2000 ACM SIGMETRICS international conference on Measurement and modeling of computer systems, 2000, pp. 44-55, ACM Press, New York, NY.

Robert H. Thomas, A Majority Consensus Approach to Concurrency Control for Multiple Copy Databases, ACM transactions on Database Systems, 1979, 4(2):180-209, ACM Press, New York, NY.

Hakim Weatherspoon et al., Erasure Coding vs. Replication: A Quantitative Comparison, 2002, Berkeley CA.

Avishai Wool, Quorum Systems in Replicated Databases: Science or Fiction?, Bulletin of the IEEE Computer Society Technical Committee on Data Engineering, 21 (4):3-11, 1998, IEEE Computer Society Press, Washington DC.

* cited by examiner

```
 1: val-ts ← ord-ts ← lowTS
 2: val ← INITIAL

3: procedure clientWrite(val)
 4:     write(val, newTS)

5: procedure write(val, ts)
 6:     replies ← Q-form([Order, ts])
 7:     if a reply is false then return ABORT
 8:     if this is the primary site then
 9:         status ← push-to-backup([SWrite, val, ts])
10:         if status = ABORT then return ABORT
11:     replies ← Q-form([Write, val, ts])
12:     if all replies are true then return OK
13:     else return ABORT 14: procedure read()
15:     replies ← Q-form([Read, val-target(s)])
16:     if the same val-ts is provided by a quorum of replies
17:         and no val-ts' or ord-ts in replies exceeds that val-ts
18:         and each of the val-target(s) has val-ts that equal that val-ts
19:         return val provided by val-target(s)
20:     else <val, high> ← recover(newTS)
21:     return val 22: procedure recover(ts)
23:     replies ← Q-form([Order&Read, ts])
24:     if a reply is false then return (ABORT, lowTS)
25:     high ← the highest timestamp returned
26:     val ← the value with the timestamp high
27:     if this is the primary site then
28:         bval ← push-to-backup([SRecover, ts, high])
29:         if bval = ABORT then return <ABORT, lowTS>
30:         if bval ≠ SAME then val ← bval
31:     replies ← Q-form([Write, val, ts])
32:     if all replies are true then return <val, high>
33:     else return <ABORT, lowTS>
```

FIG. 3A

340 {
```
41: when Q-receive([Order, ts])
42:     status ← (ts > max(val-ts, ord-ts))
43:     if status then ord-ts ← ts; store(ord-ts)
44:     Q-reply([status])

45: when Q-receive([Write, new-val, ts])
46:     status ← (ts > val-ts and ts ≥ ord-ts))
47:     if status then
48:         val ← new-val; store(val)
49:         val-ts ← ts; store(val-ts)
50:     Q-reply([status])

51: when Q-receive([Read, val-target(s)])
52:     if this storage device is a val-target then
53:         return Q-reply([val, val-ts, ord-ts])
54:     else return Q-reply([val-ts, ord-ts])

55: when Q-receive([Order&Read, ts])
56:     status ← (ts > max(val-ts, ord-ts))
57:     if status then ord-ts ← ts; store(ord-ts)
58:     Q-reply([val-ts, val, status])
```

FIG. 3B

360 {
```
61: procedure push-to-backup(msg)
62:     set timer
63:     send msg to randomly chosen brick in backup site
64:     await reply or timer expired
65:     if timer expired then return ABORT
66:     else return reply 67: when receive [Swrite, val, ts] from b
68:     reply write(val, ts) to b 69: when receive [SRecover, ts, hts] from b
70:     <val, high> ← recover(ts)
71:     if hts = high then val ← SAME
72:     reply val to b
```

FIG. 3C

METHOD OF WRITING DATA

FIELD OF THE INVENTION

The present invention relates to the field of data storage. More particularly, the present invention relates to the field of data storage where a fault tolerant algorithm improves data accessibility.

BACKGROUND OF THE INVENTION

A critical component of computer systems is data storage. Data storage can be divided conceptually into an individual user's data storage, which is attached directly to the individual's computer, and network based data storage typically intended for multiple users.

One type of network based storage device is a disk array. The disk array includes at least one controller coupled to an array of disks. Typically, components (e.g., the controller and the disks) of the disk array are hot swappable, which allows components to be replaced without turning off the disk array.

As an alternative to the disk array, researchers have been exploring data storage within a distributed storage system which includes an array of independent storage devices coupled together by a network. Each of the independent storage devices includes a processor, memory, and one or more disks. An advantage of the array of independent storage devices is lower cost. The lower cost can result from mass production of the independent storage devices as commodity items and from elimination of hot swappable features of the disk array. Another advantage is better scalability. The user can buy a few devices initially and add more devices as demand grows.

A separate development in the field of data storage is mirroring of data between a local site and a remote site, which may improve data accessibility. Existing synchronous mirroring schemes use some form of master-slave or primary-secondary replication to achieve data consistency and input/output ordering. These techniques use a single master (i.e., a single controller, a single in-band network switch, or a single virtualization appliance) that orders all input/output requests and directs them to each side of a mirror (e.g., a local site and a remote site). This single point of control is a performance bottleneck that may reduce accessibility. It would be advantageous to be able to use synchronous mirroring for the distributed storage system but such systems lack a single point of control making existing synchronous mirroring techniques not feasible for the distributed storage system.

SUMMARY OF THE INVENTION

The present invention is a method of writing data. According to an embodiment, the method begins with a first step of generating a timestamp. A second step issues a query that includes the timestamp to each of a plurality of primary storage devices. The method continues with a third step of receiving a query reply from at least a quorum of the primary storage devices. The query replies indicate that the timestamp is later than an existing timestamp for the data. In a fourth step, the data is mirrored to secondary storage after receiving the query reply from at least the quorum of the primary storage devices. Upon receiving a mirror completion message from the secondary storage, a fifth step issues a write message that includes at least a portion of the data to each of the primary storage devices.

These and other aspects of the present invention are described in more detail herein.

BRIEF DESCRIPTION OF THE DRAWINGS

The present invention is described with respect to particular exemplary embodiments thereof and reference is accordingly made to the drawings in which:

FIGS. 3A, 3B, and 3C provide pseudo code for write, read, and recover operations in accordance with embodiments of the present invention.

DETAILED DESCRIPTION OF A PREFERRED EMBODIMENT

Figure 1:
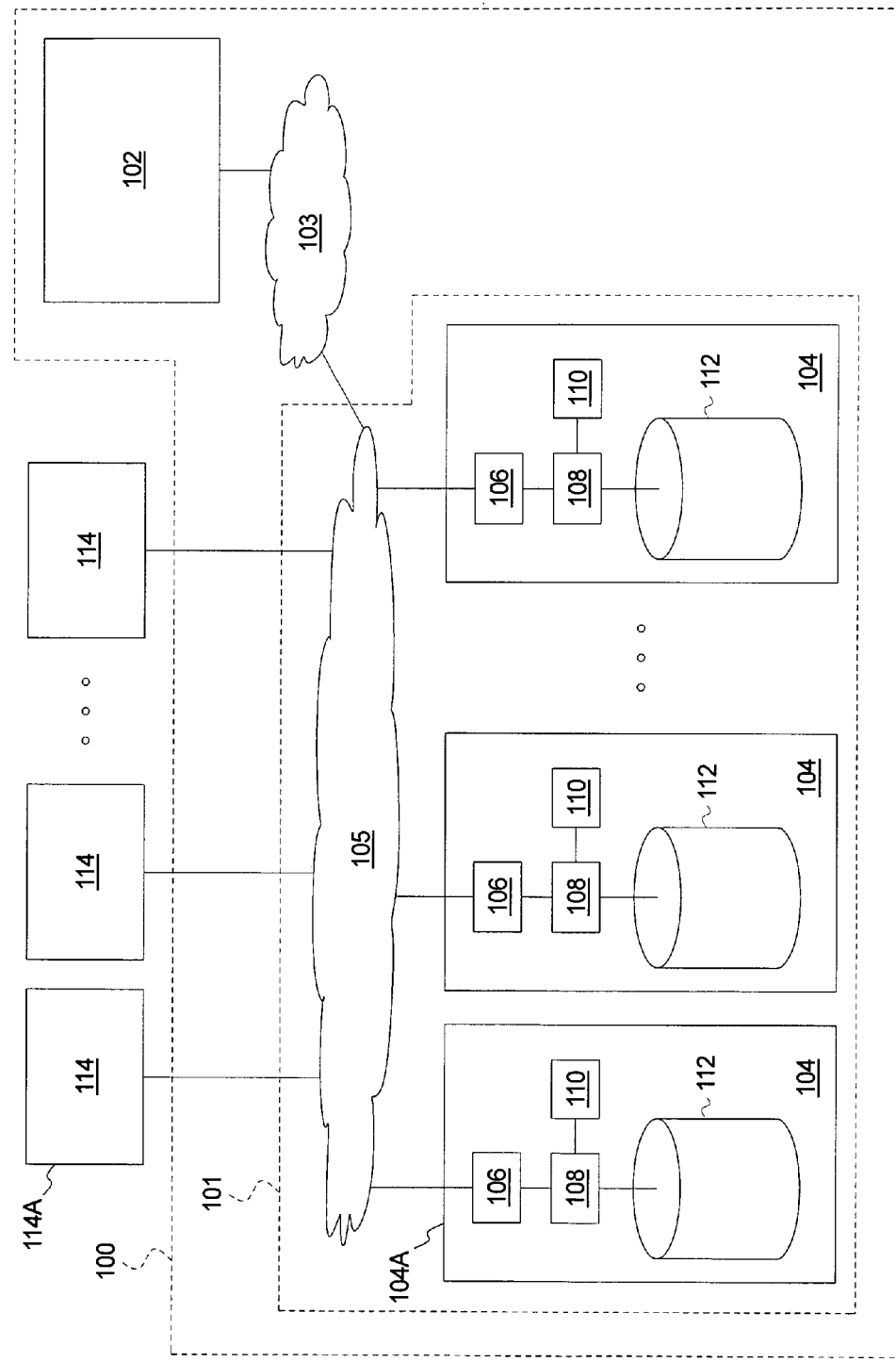
FIG. 1 illustrates a storage system that employs a method of writing data in accordance with embodiments of the present invention.

An embodiment of storage system that employs a method of writing data of the present invention is illustrated schematically in FIG. 1. The storage system 100 comprises primary storage 101 (e.g., a local storage site) and secondary storage 102 (e.g., a remote storage site), which are coupled by a communication medium such as a network (e.g., a WAN—wide area network) 103. Upon a failure of the primary storage 101, the secondary storage 102 may be accessed. For example, if the primary storage 101 is a local storage site and the secondary storage 102 is a remote storage site, the remote storage site may be accessed upon a local site failure (e.g., a regional power outage or a catastrophic event).

The primary storage 101 comprises a plurality of storage devices 104, which are coupled by a network (e.g., a LAN—local area network) 105. In an embodiment, each of the storage devices 104 comprises a network interface 106, a processor 108, a NVRAM (non-volatile random access memory) 110, and storage 112, which are coupled together. Preferably, the storage 112 within each storage device 104 comprises one or more disks. Alternatively, the storage 112 within each of one or more of the storage devices 104 comprises some other storage media such as a tape and a tape drive. One or more clients 114, which are coupled to the network 105, issue read and write requests to the primary storage 101. Preferably, the secondary storage 102 employs a plurality of storage devices and a network, which are configured similarly to the primary storage 101. Alternatively, the secondary storage 102 employs another type of storage such as a disk array.

The primary storage 101 employs a redundancy technique such as replication or erasure coding to reliably store data. A replication technique employed by the primary storage 101 replicates data blocks across a set of the storage devices 104 (e.g., three of the storage devices 104). An erasure coding technique stores m data blocks and p parity blocks across a set of n storage devices, where n=m+p. For each set of m data blocks that is striped across a set of m storage devices, a set ofp parity blocks is stored on a set ofp storage devices. The p parity blocks are determined from the m data blocks using an erasure coding technique (e.g., Reed-Solomon erasure coding). The m data blocks may be reconstructed from any m of the blocks selected from the m data blocks and the p parity blocks.

Typically, the primary storage 101 may be configured with anywhere from a few of the storage devices 104 to hundreds or more of the storage devices 104. The storage system 100 may store multiple logical volumes, where groups of the storage devices store the logical volumes. Each logical volume may be divided into segments, which are units of data distribution within the storage system 100. Typically, segments are sized at 256 MB but may be smaller or larger.

For example, if the primary storage 101 employs three-way replication and 256 MB segments, a first group of three of the storage devices 104 store a first 256 MB segment, a second group of three of the storage devices 104 store a second 256 MB segment, and so forth. Each of the storage devices 104 in the first group store the first 256 MB segment; and each of the storage devices 104 in the second group store the second 256 MB segment.

Or, for example, if the primary storage 101 employs 256 MB segments and erasure coded stripes of two data blocks and two parity blocks, a first group of four of the storage devices 104 store a first 256 MB segment, a second group of four of the storage devices 104 store a second 256 MB segment, and so forth. In the first group of four of the storage devices 104, two of the storage devices 104 store 128 MB data blocks, each being half of the data, and two of the storage devices 104 store 128 MB parity blocks. The 128 MB parity blocks are determined from the 128 MB data blocks using an erasure coding technique such as Reed-Solomon erasure coding.

Typically, clients 114, which are coupled to the network 114, issue write and read requests to the storage system 100. The clients 114 may be hosts that are acting on behalf of other clients. Typically, a particular client 114A issues a write request to a particular storage device 104A requesting that data included within the request be written to a particular logical volume at a particular offset within the logical volume. The particular storage device 104A, which may have been randomly chosen, acts as a coordinator for the write request. Any storage device 104 may act as a coordinator. So, the coordinator may or may not be one of the storage devices 104 that hold the volume or the segment that includes the data. Alternatively, the client 114, another computer, or a group of computers coupled to the network 105 acts as the coordinator.

Figure 2:
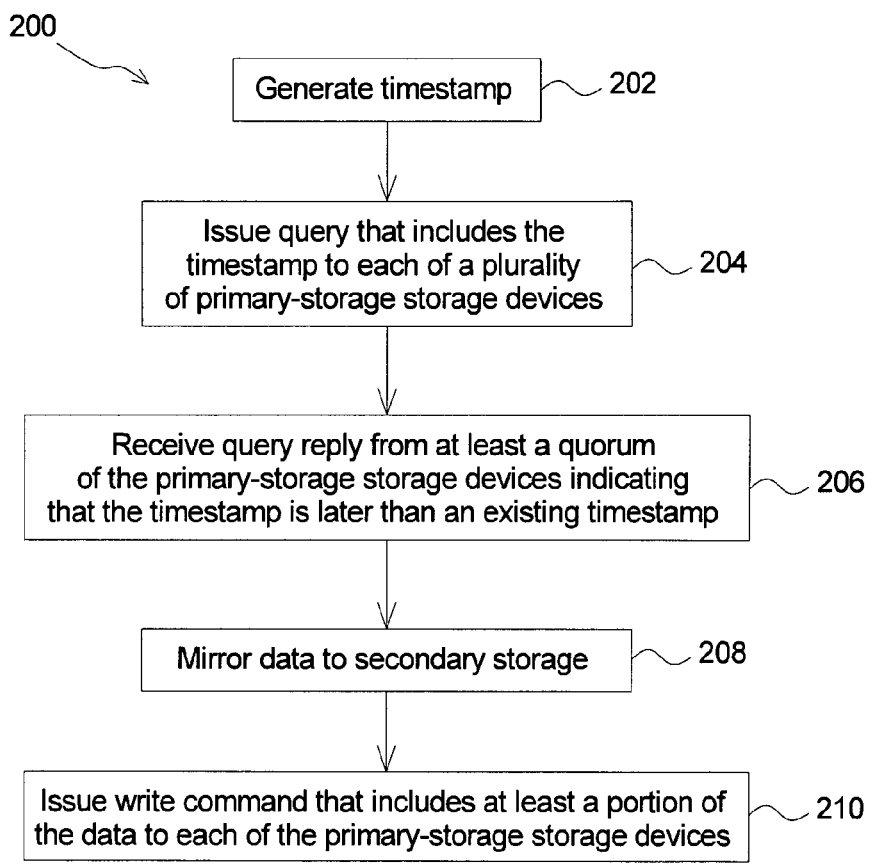
FIG. 2 illustrates an embodiment of a method of writing data of the present invention as a flow chart.

An embodiment of a method of writing data of the present invention is illustrated as a flow chart in FIG. 2. The data may be a segment to be written to a plurality of primary storage devices using replication. Or, the data may be a set of segments to be written to a plurality of primary storage devices using erasure coding. Other segments may be written to the plurality of storage devices or to one or more other pluralities of storage devices, where any two pluralities may intersect. The method 200 begins with a first step 202 of a coordinator (e.g., the particular storage device 104A of the storage system 100) generating a timestamp. Preferably, each timestamp generated is unique so that ties may be avoided. For example, unique timestamps may include a time and a coordinator identifier.

In a second step 204, the coordinator issues a query that includes the timestamp to each of a plurality of primary storage devices designated to hold the data. Upon receiving the query, a particular primary storage device may determine that an order timestamp exists for the data. The order timestamp indicates that another coordinator has written another version of the data or is attempting to write another version of the data. A value timestamp that equals the order timestamp indicates that the other version of the data has been successfully written. If the particular storage device confirms that the timestamp is later than the order timestamp and the value timestamp, it saves the timestamp as the order timestamp and sends a particular query reply to the coordinator. If not, the particular storage device may send an abort message to the coordinator, which aborts this attempt of the method 200. The coordinator may then re-initiate the method 200 on its own initiative or upon a request by a client.

In a third step 206, the coordinator receives a query reply from at least a quorum of the primary storage devices indicating that the timestamp is later than an existing timestamp. If the primary storage devices store replicated data, the quorum is a majority of the local storage devices. For example, if the replicated data is stored on three of the primary storage devices, the quorum is two of the primary storage devices. If the primary storage devices store a stripe of erasure coded data comprising m data blocks and p parity blocks and each primary storage device stores a single block (i.e., a data block or a parity block), the quorum is a number of the primary storage devices that is at least m plus one half p. For example, if the stripe of erasure coded data includes two data blocks and two parity blocks with each primary storage device storing a single block, the quorum is three of the primary storage devices.

After receiving the query reply from at least the quorum of the primary storage devices, the coordinator initiates a fourth step 208 of mirroring the data to secondary storage. In an embodiment, the mirroring operation includes sending the timestamp and the data to a secondary-storage coordinator that coordinates writing the data to a plurality of secondary storage devices.

In such an embodiment, the secondary-storage coordinator sends a secondary-storage query that includes the timestamp to each of the secondary storage devices designated to hold the data. If the secondary-storage coordinator receives a secondary-storage query reply from a quorum of the secondary storage devices indicating that the timestamp is later than a previously stored timestamp (e.g., an order timestamp and a value timestamp), it sends a secondary-storage write message that includes at least a portion of the data and the timestamp to each of the secondary-storage storage devices. If the secondary storage devices store replicated data, the quorum is a majority of the secondary storage devices. If the secondary storage devices store a stripe of erasure coded data comprising m data blocks and p parity blocks, the quorum is a number of secondary devices that is at least m plus one half p. The secondary storage devices that receive the write message check again to make sure that no later write message is being processed for the stripe being modified by this command; if so, they respond OK to the secondary coordinator. Upon receiving these replies from a quorum of the secondary storage devices, if all responses are OK, the secondary coordinator responds with a completion message to the primary coordinator.

Returning to FIG. 2, upon receiving a mirror completion message from the secondary storage, the coordinator issues a write message that includes at least a portion of the data to each of the primary storage devices in a fifth step 210. If the primary storage devices store replicated data, the write message includes a copy of the data. If the primary storage devices store erasure coded data, the write message includes a data block or a parity block and the timestamp.

The method 200 may further include receiving a write confirmation message from each of at least a second quorum of the primary storage devices indicating successful storage of the data in non-volatile memory or storage. If the primary storage devices store replicated data, the second quorum is a majority of the primary storage devices. If the primary storage devices store a stripe of erasure coded data comprising m data blocks and p parity blocks, the second quorum is a number of the primary storage devices that is at least m plus one half p.

In an embodiment, the method 200 further comprises reading the data and a value timestamp from one of the primary storage devices and confirming that the value timestamp for the data exists on a majority of the primary storage devices.

In an embodiment, the method 200 further comprises reading the data and a value timestamp from one of the primary storage devices and determining that an order timestamp or another value timestamp for the data on at least one of the primary storage devices is later than the value timestamp. This indicates a possible inconsistency in the data. In this situation, the method 200 may further include performing a recover procedure. If the recover procedure discovers that a quorum of the primary storage devices do not have a most recent version of the data, the recover procedure further includes checking the secondary storage to determine the most recent version of the data. If the most recent version of the data is unavailable from the primary storage devices, the recover procedure obtains the most recent version from the secondary storage.

Embodiments of write, read, and recover procedures of the present invention are provided in FIGS. 3A, 3B, and 3C. FIG. 3A provides a coordinator algorithm 300 for the write, read, and recover procedures as pseudo code according to an embodiment of the present invention. FIG. 3B provides a storage device algorithm 340 for the write, read, and recover procedures as pseudo code according to an embodiment of the present invention. FIG. 3C provides a mirror algorithm 360 for the write and recover procedures as pseudo code according to an embodiment of the present invention. The coordinator algorithm 300, the storage device algorithm 340, and the mirror algorithm 360 may be employed by a primary site and a secondary site. Preferably, the primary site is a local site and the secondary site is a remote site. Alternatively, the primary and secondary sites are located at the same physical location or nearly the same physical location (e.g., in different buildings on a campus).

It will be readily apparent to one skilled in the art that the coordinator algorithm 300 (FIG. 3A), the storage device algorithm 340 (FIG. 3B), and the mirror algorithm 360 (FIG. 3C) provide write, read, and recovery procedures for data val that implicitly include an identification of the data val. For example, the data val may be identified using a logical volume identifier, an offset, and a length.

The write procedure begins with a coordinator at a primary site receiving a clientWrite(val) call, which initiates the clientWrite(val) procedure of lines 3 and 4 of the coordinator algorithm 300 (FIG. 3A). In line 4, the coordinator generates a new timestamp according to a newTS command and invokes a write(val, ts) procedure of lines 5 through 13, where ts is the new timestamp. In line 6, the coordinator executes a Q-form([Order, ts]) command, which contacts the primary-site storage devices that are designated to store the data val.

The Q-form([Order, ts]) command invokes a Q-receive ([Order, ts]) procedure of the storage device algorithm 340 (FIG. 3B), lines 41 through 43, at each primary-site storage device that is designated to store the data val. In line 42, each primary-site storage device determines whether the timestamp ts is later than both a value timestamp val-ts and an order timestamp ord-ts, assigning true or false to the variable status according to the determination. In line 43, each primary-site storage device that has a true value for the variable status saves the timestamp ts as the order timestamp ord-ts. In line 44, each primary-site storage device executes a Q-reply([status]) command, which returns the variable status to the coordinator.

The Q-reply([status]) commands from the primary-site storage devices provide the replies of line 6 of the coordinator algorithm 300 (FIG. 3A). The coordinator algorithm 300 waits at line 6 until receiving at least a quorum of replies. If a false reply is received, the coordinator aborts at line 7. If at least a quorum of replies is received and there are no false replies, the coordinator performs a mirror operation at line 8 through 10 that mirrors the data val to the secondary site. In line 9 of the mirror operation, the coordinator executes a push-to-backup([SWrite, val, ts]) command.

The push-to-backup([SWrite, val, ts]) command invokes a push-to-backup([msg]) procedure of the mirror algorithm 360 (FIG. 3C), lines 61 through 66, setting a default timer in line 62 and sending [SWrite, val, ts] to a randomly chosen storage device (i.e., a brick) of the secondary site (i.e., a backup site) at line 63. The randomly chosen storage device of the secondary site executes lines 67 and 68 of the mirror algorithm 360, which invokes the write procedure of lines 5 through 13 of the coordinator algorithm 300 (FIG. 3A) at the secondary site. Thus, the randomly chosen storage device at the secondary site becomes a secondary-site coordinator for a secondary-site write operation. Returning to FIG. 3C, if the timer expires or a quorum condition is not met, the coordinator (i.e., the primary-site coordinator) aborts at lines 65 or 66, respectively. Otherwise, upon successful completion of the mirror operation, the coordinator continues with the primary-site write operation.

If the mirror operation is completed successfully, the coordinator executes a Q-form([Write, val, ts]) command at line 11 of the coordinator algorithm 300 (FIG. 3A), which contacts each of the primary-site storage devices. If the primary-site storage devices store replicated data, each Q-form ([Write, val, ts]) command includes the data val. If the primary-site storage devices store erasure coded data, each Q-form([Write, val, ts]) command includes a data block or a parity block. Alternatively, if the primary-site storage devices store erasure coded data, the data val may be sent to each primary-site storage device and each primary-site storage device may determine its block (i.e., by identifying its data block or by calculating its parity block).

The Q-form([Write, val, ts]) command invokes a Q-receive ([Write, new-val, ts]) command at each of the primary-site storage devices, which is lines 45 through 50 of the storage device algorithm 340 (FIG. 3B). In line 46, the primary-site storage devices determine whether the timestamp ts is later than the value timestamp val-ts and no earlier than the order timestamp ord-ts, assigning true or false to the variable status according to the determination. If the variable status is true, the primary-site storage device stores the value new-val as val at line 48 and stores the timestamp ts as the value timestamp val-ts at line 49. In line 50, the primary-site storage device executes the Q-reply([status]) command, which provides the variable status to the coordinator.

The Q-reply([status]) commands from the primary-site storage devices provide the replies of line 11 of the coordinator algorithm 300 (FIG. 3A). The coordinator algorithm 300 waits at line 11 until at least a quorum of replies has been received. If a false reply is received, the coordinator aborts at line 13. If a quorum of true replies are received and there are no false replies, the coordinator returns an acknowledgement of a successful write to the client.

The read procedure begins with a coordinator at a primary site receiving a read( ) call, which initiates the read( ) procedure of lines 14 through 21 of the coordinator algorithm 300 (FIG. 3A). In line 15, the coordinator executes a Q-form ([Read, val-target(s)]) command, which contacts the primary-site storage devices that hold the data val. For replicated data, the val-target is the particular primary-site storage device that is designated to return the data val. If the coordinator is one of the primary-site storage devices, network bandwidth may be conserved by identifying itself as the particular primary-site storage device designated to return the data val. For erasure coded data having m data blocks and p parity blocks, the val-targets are the m particular primary-site storage devices that are to return their portion of the data (i.e., the data block or the parity block stored on the device).

The Q-form([Read, val-target(s)]) command invokes a Q-receive([Read, val-target(s)]) command at each of the primary-site storage devices, which is lines 51 through 54 of the storage device algorithm 340 (FIG. 3B). If the primary-site storage device is a val-target, it replies to the coordinator with the data val (a data block or a parity block for erasure coded data), the value timestamp val-ts, and the order timestamp ord-ts according to the Q-reply([val, val-ts, ord-ts]) command at line 53. If the primary-site storage device is not a val-target, it replies to the coordinator with the value timestamp val-ts and the order timestamp ord-ts according to the Q-reply([val-ts, ord-ts]) command at line 54.

The Q-reply([val, val-ts, ord-ts]) and Q-reply([val-ts, ord-ts]) commands provide the replies of line 15 of the coordinator algorithm 300 (FIG. 3A). In lines 16 through 18, the coordinator determines whether a quorum of replies has a quorum value for the value timestamp val-ts, no timestamp has a value that is later than the quorum value, and the data val has been returned by the val-target(s). If these conditions are met, the coordinator returns the data val to the client at line 19. If the primary site storage devices employ replication, the data val is returned by the val-target. If the primary site storage devices employ erasure coding, the data val is determined from data returned by the val-targets. If the conditions are not met, the coordinator invokes a recover procedure at line 20.

If the primary-site storage devices hold replicated data and the coordinator is one of the primary-site storage devices, the coordinator may invoke an alternative read procedure that broadcasts the value timestamp val-ts for its copy of the data val to the other primary-site storage devices that hold the replicated data. In response the other primary-site storage devices determine if they also have the value timestamp val-ts and that the order timestamp ord-ts is no later than the value timestamp val-ts. The other primary-site storage devices may then respond with true or false according to the determination. If the coordinator receives at least a quorum of replies and no reply is false, the coordinator returns the data val stored on the coordinator. If the coordinator does not receive at least a quorum of replies or a reply is false, the coordinator invokes the recover procedure.

The recover procedure of the coordinator algorithm 300 (FIG. 3A) begins with the coordinator calling the recover procedure from within the read procedure at line 20 as recover (newTS), which causes the coordinator to generate a new timestamp according to the command newTS and to invoke the recover(ts) procedure at lines 22 through 33, where ts is the new timestamp. In line 23, the coordinator executes a Q-form([Order&Read, ts]) command, which contacts the primary-site storage devices that store the data val.

The Q-form([Order&Read, ts]) command invokes a Q-receive([Order&Read, ts]) command at each of the primary-site storage devices, which is lines 55 through 58 of the storage device algorithm 340 (FIG. 3B). In line 56, each primary-site storage device determines whether ts is later than the value timestamp val-ts and the order timestamp ord-ts for the data val, assigning true or false to the variable status according to the determination. If the primary-site storage device has true for the variable status, it assigns ts to the order timestamp ord-ts and saves it at line 57. In line 58, each primary-site storage device invokes a Q-reply([val-ts, val, status]) command.

The Q-reply([val-ts, val, status]) commands from the local storage devices provide the replies of line 23 of the coordinator algorithm 300 (FIG. 3A). The coordinator waits at line 23 until receiving at least a quorum of the replies. If a reply has a false value for the variable status, the coordinator aborts at line 24. If no reply has a false value for the variable status, the coordinator assigns the most recent value timestamp val-ts (i.e., the quorum val-ts) to the variable high and assigns the corresponding data val (i.e., the qurom val) to the variable val at lines 25 and 26.

In lines 27 through 30, the coordinator ensures consistency between the primary and secondary sites or aborts. In line 28, the coordinator invokes a push-to-backup([SRecover, ts, high]) command. The push-to-backup([SRecover, ts, high]) command invokes a push-to-backup(msg) procedure of the mirror algorithm 360 (FIG. 3C), which sets a default timer at line 62 and sends [SRecover, ts, hts] to a randomly chosen storage device (i.e., a brick) of the secondary site at line 63. The randomly chosen storage device of the secondary site executes lines 70 through 72, which invokes the recover procedure of lines 22 through 33 of the coordinator algorithm 300 (FIG. 3A) at the secondary site. Thus, the randomly chosen storage device at the secondary site becomes a secondary-site coordinator for a secondary-site recover procedure. Returning to FIG. 3C, if the timer expires or a quorum condition is not met, the coordinator (i.e., the local-site coordinator) aborts at lines 65 or 66, respectively. If the secondary-site coordinator determines that the secondary site has more recent data val than the primary site, the secondary-site coordinator returns the more recent data val along with its value timestamp val-ts. Otherwise, the secondary-site coordinator indicates that the secondary site has the same data val and value timestamp val-ts as the primary site.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of writing data comprising the steps of:
generating a timestamp related to writing the data;
issuing, by a processor, a query that includes the timestamp to each of a plurality of primary storage devices;
receiving, by the processor, a query reply from at least a quorum of the primary storage devices indicating that the timestamp is later than an existing timestamp for the data;
after receiving the query reply from at least the quorum of the primary storage devices, initiating, by the processor, mirroring of the data to secondary storage; and
upon receiving a mirror completion message from the secondary storage, issuing, by the processor, a write message that includes at least a portion of the data to each of the primary storage devices.

2. The method of claim 1 wherein the write message issued to each of the primary storage devices further includes the timestamp.

3. The method of claim 1 wherein the write message issued to each of the primary storage devices further includes another timestamp generated after the timestamp.

4. The method of claim 1 wherein a coordinator that includes the processor performs the steps of generating the timestamp, issuing the query to the primary storage devices, receiving the query reply form at least the quorum of the primary storage devices, and issuing the write message to each of the primary storage devices.

5. The method of claim 4 wherein the timestamp includes a time and an identifier of the coordinator.

6. The method of claim 4 wherein the coordinator is one of the primary storage devices.

7. The method of claim 1 wherein each of the primary storage devices comprises a processor, non-volatile memory, and storage.

8. The method of claim 7 wherein the storage includes disk storage.

9. The method of claim 1 wherein a particular one of the primary storage devices receives the query, determines that an order timestamp exists, confirms that the generated timestamp is later than the order timestamp and a value timestamp, saves the generated timestamp as the order timestamp, and sends a particular query reply responsive to the query to the processor.

10. The method of claim 1 wherein a particular one of the primary storage devices receives the query, determines that an order timestamp does not exist, confirms that the generated timestamp is later than a value timestamp, saves the generated timestamp as the order timestamp, and sends a particular query reply responsive to the query to the processor.

11. The method of claim 1 wherein initiating the mirroring of the data to the secondary storage comprises sending the timestamp and the data to a secondary-storage coordinator to cause the secondary-storage coordinator to mirror the data to the secondary storage.

12. The method of claim 11 further comprising the secondary-storage coordinator:
sending a secondary-storage query that includes the timestamp to each of a plurality of secondary storage devices that are part of the secondary storage;
receiving a secondary-storage query reply from at least a second quorum of the secondary storage devices indicating that the timestamp is later than a previously stored timestamp; and
in response to receiving the secondary-storage query reply from at least the second quorum of the secondary storage devices, sending a secondary-storage write message that includes at least a portion of the data and the timestamp to each of the secondary storage devices.

13. The method of claim 1 wherein the primary storage devices employ replication to store the data.

14. The method of claim 13 wherein the secondary storage employs replication to store the data.

15. The method of claim 13 wherein the secondary storage employs erasure coding to store the data.

16. The method of claim 1 wherein the primary storage devices employ erasure coding to store the data.

17. The method of claim 16 wherein the secondary storage employs replication to store the data.

18. The method of claim 16 wherein the secondary storage employs erasure coding to store the data.

19. A method of writing data comprising the steps of:
generating a timestamp related to writing the data;
issuing, by a processor, a query that includes the timestamp to each of a plurality of primary storage devices, each of the plurality of primary storage devices storing a replica of a previously written version of the data;
receiving, by the processor, a query reply from at least a quorum of the primary storage devices indicating that the timestamp is later than an existing timestamp;
in response to receiving the query reply from at least the quorum of the primary storage devices, initiating, by the processor, mirroring of the data to secondary storage; and
upon receiving a mirror completion message for the mirroring of the data from the secondary storage, issuing a write message that includes the data to each of the primary storage devices.

20. The method of claim 19 wherein the plurality of primary storage devices store replicated data.

21. The method of claim 20 wherein the quorum is a majority of the primary storage devices.

22. The method of claim 20 further comprising receiving a write confirmation message from each of at least a second quorum of the primary storage devices indicating successful storage of the data in non-volatile memory or storage.

23. The method of claim 22 wherein the second quorum is a majority of the primary storage devices.

24. The method of claim 20 further comprising reading the data and a value timestamp from one of the primary storage devices and confirming that the value timestamp for the data exists on a majority of the primary storage devices.

25. The method of claim 20 further comprising reading the data and a value timestamp from one of the primary storage devices and determining that an order timestamp or another value timestamp on at least one of the primary storage devices is later than the value timestamp.

26. The method of claim 25 further comprising performing a recover procedure.

27. The method of claim 26 wherein the recover procedure includes checking the secondary storage for a most recent value of the data.

28. A method of writing data comprising the steps of:
generating a timestamp related to writing the data;
issuing, by a processor, a query that includes the timestamp to each of a plurality of primary storage devices, the plurality of primary storage devices storing a stripe of erasure coded data that comprises m data blocks and p parity blocks, each primary storage device storing a data block or a parity block;
receiving, by the processor, a query reply from each of at least a quorum of the primary storage devices indicating that the timestamp is later than an existing timestamp;
after receiving the query reply from each of at least the quorum of the primary storage devices, initiating, by the processor, mirroring of the data to secondary storage; and
upon receiving a mirror completion message from the secondary storage, issuing a write message that includes a data block or a parity block to each of the primary storage devices.

29. The method of claim 28 wherein the quorum is a number of the primary storage devices that is at least m plus one half p.

30. The method of claim 28 further comprising receiving a write confirmation message from each of at least a second quorum of the primary storage devices indicating successful storage of a data block or a parity block of the stripe of erasure coded data.

31. The method of claim 30 wherein the second quorum is a number of the primary storage devices that is at least m plus one half p.

32. The method of claim 28 further comprising reading the data and value timestamps from m blocks selected from the data blocks and the parity blocks and confirming that the value timestamps for the data exist on at least m plus one half p of the primary storage devices.

33. The method of claim 28 further comprising attempting to read the data and determining that at least two blocks selected from the data blocks and the parity blocks have different value timestamps.

34. The method of claim 33 further comprising performing a recover procedure.

35. The method of claim 34 wherein the recover procedure includes checking the secondary storage for a most recent value of the data.

36. A method of writing data comprising the steps of:
generating a timestamp related to writing the data;
issuing, by a processor, a query that includes the timestamp to each of a plurality of primary storage devices;
receiving, by the processor, a query reply from at least a quorum of the primary storage devices indicating that the timestamp is later than an existing timestamp;
after receiving the query reply from at least the quorum of the primary storage devices, mirroring the data to secondary storage which comprises:
sending a secondary-storage query that includes the timestamp to each of a plurality of secondary storage devices;
receiving a secondary-storage query reply from at least a second quorum of the secondary storage devices indicating that the timestamp is later than a previously stored timestamp; and
sending a secondary-storage write message that includes at least a portion of the data and the timestamp to each of the secondary storage devices; and
upon receiving a mirror completion message from the secondary storage, issuing a write message that includes at least a portion of the data to each of the primary storage devices.

37. The method of claim 36 wherein the plurality of secondary storage devices store replicated data.

38. The method of claim 37 wherein the second quorum is a majority of the secondary storage devices.

39. The method of claim 36 wherein the plurality of secondary storage devices store a stripe of erasure coded data, each secondary storage device storing a data block or a parity block, the stripe of erasure coded data comprising m data blocks and p parity blocks.

40. The method of claim 39 wherein the second quorum is a number of the secondary storage devices that is at least m plus one half p.

41. A non-transitory computer readable medium having stored thereon computer code which, when executed, implements a method of writing data, the method of writing data comprising the steps of:
generating a timestamp;
issuing a query that includes the timestamp to each of plurality of primary storage devices;
receiving a query reply from at least a quorum of the primary storage devices indicating that the timestamp is later than an existing timestamp for the data;
after receiving the query reply from at least the quorum of the primary storage devices, mirroring the data to secondary storage; and
upon receiving a mirror completion message from the secondary storage, issuing a write message that includes at least a portion of the data to each of the primary storage devices.

42. A non-transitory computer readable medium having stored thereon computer code which, when executed, implements a method of writing data, the method of writing data comprising the steps of:
generating a timestamp;
issuing a query that includes the timestamp to each of a plurality of primary storage devices, each of the plurality of primary storage devices storing a replica of a previously written version of the data;
receiving a query reply from at least a quorum of the primary storage devices indicating that the timestamp is later than an existing timestamp;
after receiving the query reply from at least the quorum of the primary storage devices, mirroring the data to secondary storage; and
upon receiving a mirror completion message from the secondary storage, issuing a write message that includes the data to each of the primary storage devices.

43. A non-transitory computer readable medium having stored thereon computer code which, when executed, implements a method of writing data, the method of writing data comprising the steps of:
generating a timestamp;
issuing a query that includes the timestamp to each of a plurality of primary storage devices, the plurality of primary storage devices storing a stripe of erasure coded data that comprises m data blocks and p parity blocks, each primary storage device storing a data block or a parity block;
receiving a query reply from each of at least a quorum of the primary storage devices indicating that the timestamp is later than an existing timestamp;
after receiving the query reply from each of at least the quorum of the primary storage devices, mirroring the data to secondary storage; and
upon receiving a mirror completion message from the secondary storage, issuing a write message that includes a data block or a parity block to each of the primary storage devices.

44. A non-transitory computer readable medium having stored thereon computer code which, when executed, implements a method of writing data, the method of writing data comprising the steps of:
generating a timestamp;
issuing a query that includes the timestamp to each of a plurality of primary storage devices;
receiving a query reply from at least a quorum of the primary storage devices indicating that the timestamp is later than an existing timestamp;
after receiving the query reply from at least the quorum of the primary storage devices, mirroring the data to secondary storage which comprises:
sending a secondary-storage query that includes the timestamp to each of a plurality of secondary storage devices;
receiving a secondary-storage query reply from at least a second quorum of the secondary storage devices indicating that the timestamp is later than a previously stored timestamp; and
sending a secondary-storage write message that includes at least a portion of the data and the timestamp to each of the secondary storage devices; and
upon receiving a mirror completion message from the secondary storage, issuing a write message that includes at least a portion of the data to each of the primary storage devices.

\* \* \* \* \*